United States Patent [19]

Hofmann

[11] Patent Number: 5,712,678
[45] Date of Patent: Jan. 27, 1998

[54] METHOD AND APPARATUS FOR SCANNING A TERRAIN SURFACE

[75] Inventor: Otto Hofmann, Kirchstockach, Germany

[73] Assignee: Messerschmitt Bolkow Blohm GmbH, Munich, Germany

[21] Appl. No.: 524,319

[22] Filed: Sep. 6, 1995

Related U.S. Application Data

[63] Continuation of Ser. No. 72,803, Jun. 7, 1993, which is a continuation-in-part of Ser. No. 750,755, Aug. 22, 1991, abandoned, which is a continuation of Ser. No. 281,851, Dec. 8, 1988.

[51] Int. Cl.$^6$ ............................... H04N 7/18; H04N 9/47
[52] U.S. Cl. ........................ 348/117; 348/144; 348/146; 250/235; 250/236
[58] Field of Search ................................ 348/117, 143, 348/144, 145, 146; 364/423, 516, 517, 525; 250/235, 236, 347, 353

[56] References Cited

U.S. PATENT DOCUMENTS

| | | | |
|---|---|---|---|
| 2,967,211 | 1/1961 | Blackstone et al. | 348/146 |
| 3,019,292 | 1/1962 | John | 348/146 |
| 3,294,903 | 12/1966 | Goldmark et al. | 348/145 |
| 3,719,775 | 3/1973 | Takaoka et al. | 348/145 |
| 3,808,361 | 4/1974 | Hofmann | 348/145 |
| 4,231,062 | 10/1980 | Stewich | 348/144 |
| 4,814,607 | 3/1989 | Hofmann | 250/235 |
| 5,043,924 | 8/1991 | Hofmann | 364/525 |

Primary Examiner—Edward L. Coles, Sr.
Assistant Examiner—Thomas D. Lee
Attorney, Agent, or Firm—Anderson, Kill & Olick P.C.

[57] ABSTRACT

A method and apparatus are disclosed for scanning a surface of an object, transversely to a direction of motion. A scanner is provided for flying over the object at a flight altitude and flight velocity, having a system focal length, a scanning element rotating at a rotation speed which scans a surface over a scanning angle and a detector row, arranged at right angles to the scanning direction. A detector row is provided with a plurality of equal size individual detectors, which are capable of generating fundamental object pixels of a size which depends upon the distance from the object up to a maximum scanning distance. A standard object pixel, of a size corresponding to a fundamental object pixel, is driven at the maximum scanning distance. For each scanning sweep, via a sampling process, a uniform grid is formed which is composed of standard object pixels at a size corresponding to a fundamental object pixel at the maximum scanning distance in several lines and without gaps and/or overlaps. Uniform grids of consecutive sweeps have no gaps and overlaps between each other. A sampling process is performed for forming a uniform grid, independent of an actual flight altitude, and an actual flight velocity for each scanning sweep. The system focal length and the rotational speed of the scanner are controlled as functions of an actual flight altitude and flight velocity so that uniform grids, of consecutive scanning sweeps, have no gaps and/or overlaps between each other.

3 Claims, 5 Drawing Sheets

Constant Foot Print Frame

Constant Foot Print Frame

METHOD AND APPARATUS FOR SCANNING A TERRAIN SURFACE

This is a continuation application of application Ser. No. 08/072,803, filed Jun. 7, 1993; which in turn is a continuation-in-part application of application Ser. No. 07/750,755, filed Aug. 22, 1991; now ABN. which in turn is a continuation application of application Ser. No. 07/281,851, filed Dec. 8, 1988.

FIELD OF THE INVENTION

The present invention is directed to an improvement of a method and apparatus, for scanning a terrain surface and/or other objects transversely to the direction of flight, or to the direction of motion, of an aircraft, or a missile, with a scanner which contains several individual detectors of equal size and which are arranged in a row transversely to the scanning direction.

BACKGROUND OF THE INVENTION

Such a method and apparatus are described in U.S. Pat. No. 5,043,924 entitled "Method and apparatus for Scanning an Object".

For one sweep of the scanner, a uniform pixel grid is produced with this method which has equally large standard pixels B and which is free of gaps and overlaps, independently of the distance of the object or of the scanning angle. Basically, this uniform standard pixel grid is achieved by an electronic resampling of the directly measured fundamental pixel grid.

This process is defined by instrumentation parameters, such as the detector size, the pixel size, the pixel frequency, the focal length of the optical system of the scanner, the scanning velocity, the total scanning angle, the flight velocity and flight altitude, and the desired resolution, etc. These instrumentation parameters, and a number of calculation constants derived therefrom, are used in the algorithm and the program control of the resampling process in order to produce the above uniform grid of object pixels.

To achieve a continuous pattern of uniform grids of consecutive sweeps of the scanner, without gaps and overlaps, the instrumentation parameters and the calculation constants of the resampling process must be held constant, including the flight velocity and the flight altitude. Therefore, the scanning process must be performed at a pre-determined constant flight velocity and a predetermined flight altitude. Otherwise, the uniform grids of consecutive sweeps would overlap or have gaps between each other.

If the flight velocity and/or the flight altitude are changed, the calculation constants of the resampling process also change. Moreover, the complex program control of the resampling process varies with varying flight altitudes and flight velocities. If the resampling process is arranged to produce the above adjacent uniform grids, an individual set of calculation constants must be stored for each flight velocity and flight altitude. Since the resampling process is a very complex process, such a modification would need a high storage capacity, a broad band width of the electronic equipment, and a flexible program control. For an acceptable flexibility of the instrumentation, the increasing storage capacity and the additional electronic equipment are often not available at reasonable costs.

SUMMARY OF THE INVENTION

It is an object of the present invention to modify the scanning process so that an object can be scanned at different flight velocities and flight altitudes without the need for a complex and variable program control.

The problems described above are solved in the present invention by giving the scanner a changeable system focal length F and a changeable scanning speed U which is controlled by the flight altitude h and the flight speed v.

If the scanning procedure is performed at a flight velocity and/or flight altitude other than the pre-determined values, then only the focal length of the system, and the rotational speed of the scanner, are set to new values while the resampling process, with its algorithm and program control, remains unchanged.

The new values are set in such a manner that the uniform grids of consecutive scanning sweeps have no gaps or overlaps between them. This results in a resampling process that remains constant for all of the image recording altitudes with constant pixel frequency and constant band width of the electronics.

Accordingly, it is an object of the present invention to provide for a method and an apparatus for scanning a terrain surface and/or other objects transversely to the direction of flight, or to the direction of motion, of an aircraft, or a missile, with a scanner which contains several individual detectors of equal size and which are arranged in a row transversely to the scanning direction.

It is another object of the present invention to provide a method and apparatus for scanning a terrain surface which modifies the scanning process so that an object can be scanned at different flight velocities and flight altitudes without the need for a complex and variable program control.

It is another object of the present invention to provide a method and an apparatus for scanning a terrain surface wherein the new values of the scanner are set in such a manner that the uniform grids of consecutive scanning sweeps have no gaps or overlaps between them.

It is yet another object of the present invention to provide a method and an apparatus for scanning a terrain surface which results in a resampling process which remains constant for all of the image recording altitudes with constant pixel frequency and constant band width of the electronics.

Other objects and advantages of the present invention will be made apparent to those skilled in the art upon a review of the Detailed Description of the Preferred Embodiment taken in conjunction with the drawings which follow.

DETAILED DESCRIPTION OF THE PREFERRED EMBODIMENT

Figure 1A:
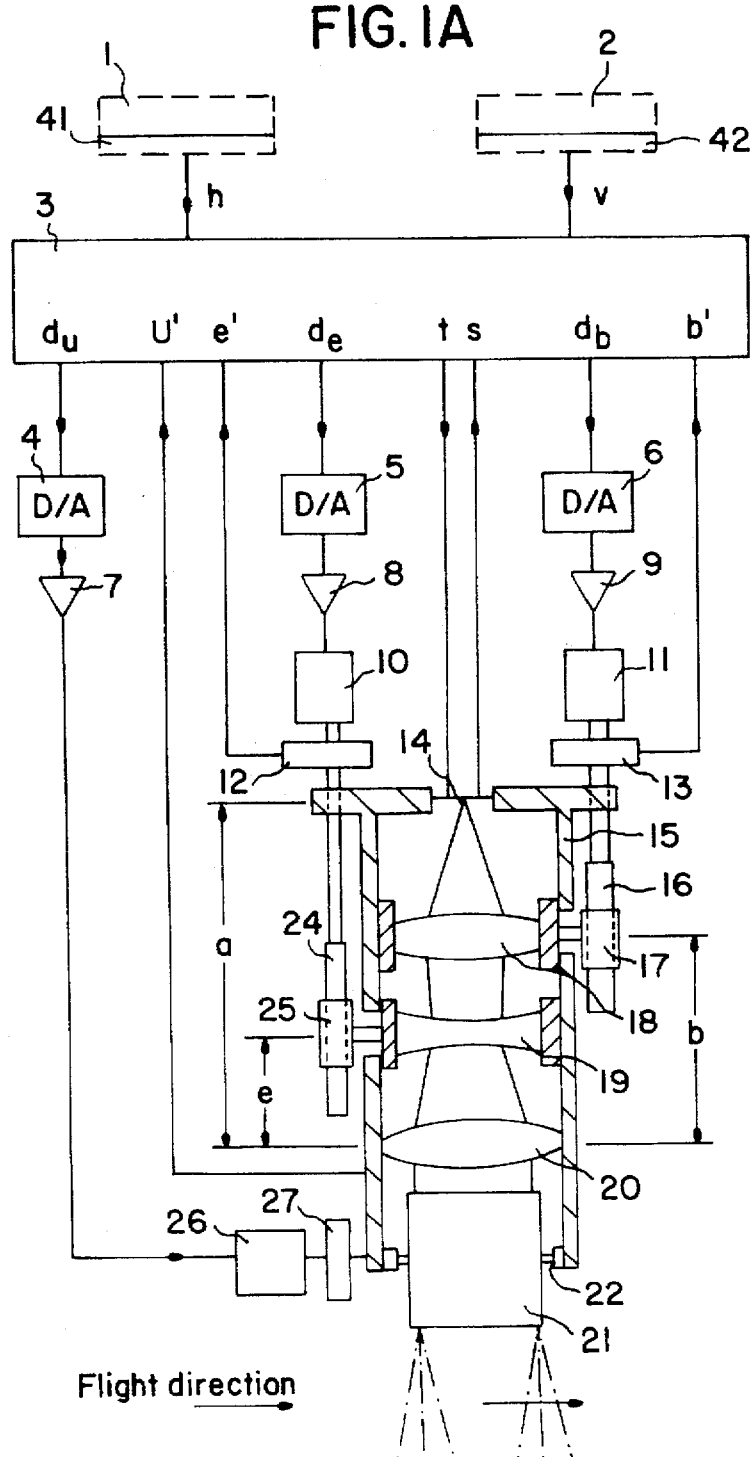
FIG. 1A illustrates a construction of the scanner which is the subject of the present invention and which has a variable focal length, wherein the optical elements are illustrated in section vertically and in the flight direction.
Figure 1B:
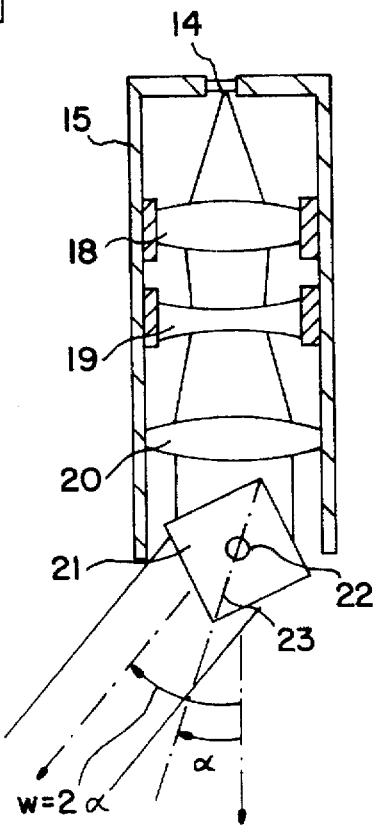
FIG. 1B illustrates a section vertically and normal to the flight direction through the optical elements.
Figure 1C:
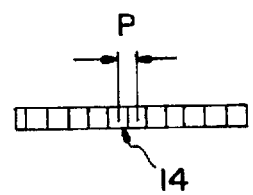
FIG. 1C illustrates a schematic enlarged view of a sensor cell for the scanner.

Referring to FIGS. 1A, 1B and 1C, the scanner, which is the subject of the present invention, comprises a digital processor 3, to which data concerning the flight altitude and the flight speed is fed via the sensors 1 and 2, as well as the optical-mechanical portion of the scanner which includes a scanner housing 15, a sensor 14, lenses 18, 19 and 20 and a scanning prism 21, as well as the corresponding drive elements, namely, the spindles 16 and 24 and the servomotors 10, 11 and 26.

The optical system includes the lens groups 18, 19 and 20 which, in their entirety, produce the system focal length F. The system focal length F can be varied by displacing the lens or lens group 18 and lens group 19 from the minimum system focal length $F_{min}$ to the maximum system focal length $F_{max}$. The lens group 18 is at a distance b from the front lens 20, while the lens group 19 is at a distance e. The distance a of the front lens 20, from the focal plane in which the sensor line 14 is arranged, is constant.

Figure 2:
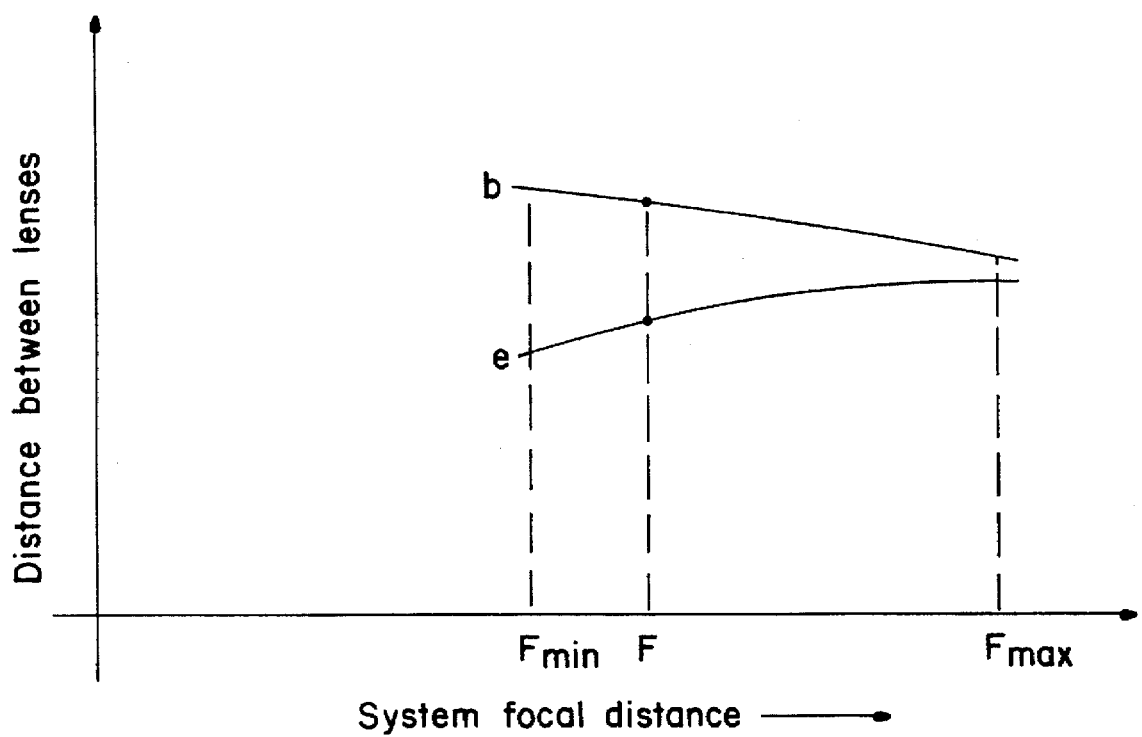
FIG. 2 illustrates a look-up table for adjusting the lenses of the scanner.
Figure 3:
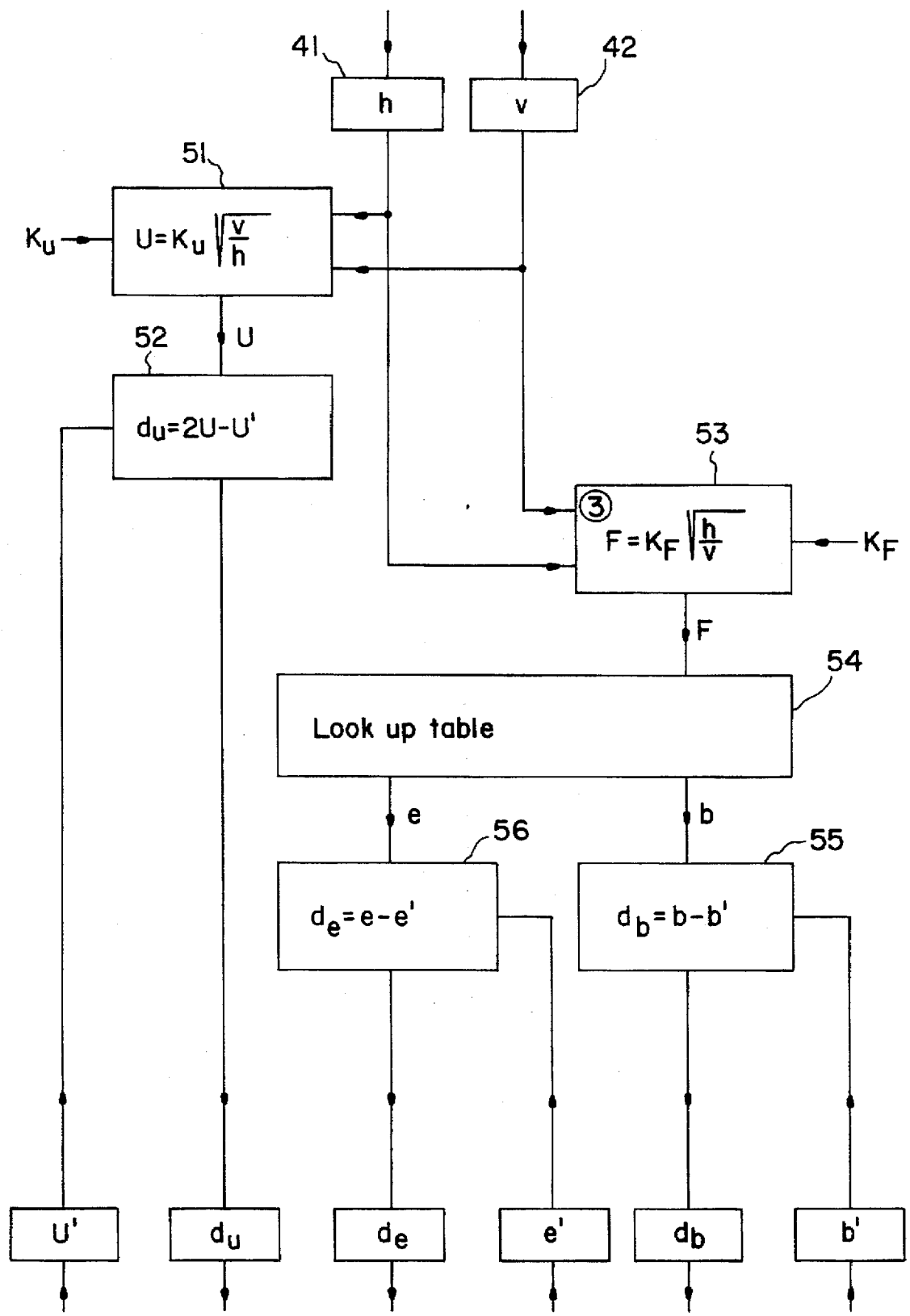
FIG. 3 illustrates a signal flow chart with the entered computing processes in the digital processor of the scanner.

The distances b and e are plotted in FIG. 2 as a function of the system focal length F. This diagram is stored in the processor in the form of a look-up table 54 which is illustrated in FIG. 3. The distances b and e are given in a known manner from the calculations of the entire optical system. The focal lengths, the lens thicknesses and the distances, as well as, the refractive indices of the types of glass employed, are included in these calculations.

Referring again to FIG. 1A, a scanning prism 21 is supported in front of the front lens group 20 so as to be rotatable around its axis 22. This scanning prism has a rectangular form and is composed of two triangular prisms which contact in the diagonal surface 23 of the rectangle. When the scanning prism 21 is rotated through a angle Alpha, due to the reflection at the diagonal surface 23, the parallel beam bundle of the optical system is diverted or deflected through the double angle Omega which is equal to twice the value of Alpha so that a sweep is effected transversely to the flight direction from $+Omega_{max}$ to $-Omega_{max}$.

The displacement of the lenses 18 and 19 is effected via spindles 16 and 24 with the spindle nuts 17 and 25, respectively. These spindles are driven via the servomotors 10 and 11, respectively. The distances b' and e' are measured by angular position transmitters 12 and 13 which are coupled with the measurement spindles. Here, as described below, values with an apostrophe (') are understood as being actual values.

The scanning prism 21 is driven by the servomotor 26 and the rotational speed U' is measured by pulse transmitters 27 which are coupled at the rotational axis 22. As illustrated in FIG. 1C, the sensor 14 is arranged in the focal plane of the optical system and includes a linear arrangement of M discrete detectors, which have their magnitude, or distance from center to center, equal to the distance p.

Figure 4:
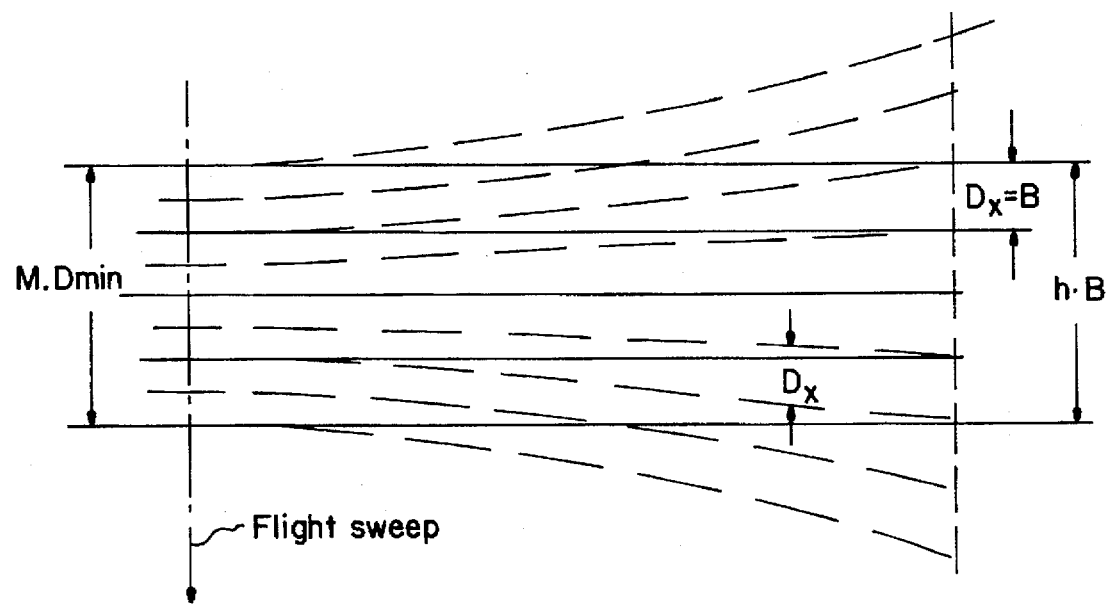
FIG. 4 illustrates the picture geometry in outline.

The linear dimension of the sensor 14 extends in the flight direction. A strip of terrain is scanned by the rotation of the scanning prism 21 transverse to the flight direction, which is illustrated in FIG. 4. This scanning strip expands as the scanning angle Omega increases and as the scanning distance E increases, wherein E=h/cos (Omega). The element which is scanned by a sensor on the part of the object, which is vertical to the scanning beam and which is designated as an object pixel, has the following value according to equation (1) below:

$$D_x = \frac{p \cdot E}{F} = \frac{p \cdot h}{F \cos(\text{Omega})} \quad (1)$$

At maximum scanning distance, $E_{max}$, which corresponds to the object pixel size which is designated as B, is given by equation (2) as follows:

$$D_{max} = B = \frac{p \cdot h}{F \cdot \cos(\text{Omega}_{max})} \quad (2)$$

The width of the entire scanning strip is given as the product of M and $D_x$, while the smallest width in the flight path, i.e. when the scanning angle Omega is equal to zero, is given by equation (3) as follows:

$$M \cdot D_{min} = M \cdot \frac{p \cdot h}{F} \quad (3)$$

By means of a resampling process, which corresponds to U.S. Pat. No. 5,043,924, the scanning strip, which is expanded outward according to FIG. 4, is reduced to the above minimum width. A uniform object pixel size, which corresponds to the maximum object pixel size B, is selected for the entire scanning strip reduced in this manner. This provides for equations (4) and (5) below:

$$M \cdot \frac{p \cdot h}{F} = n \cdot B = n \cdot \frac{p}{F} \cdot E_{max} \quad (4)$$

$$k = \frac{E_{max}}{h} = \frac{M}{n} \quad (5)$$

It is important to note that the focal length F remains unchanged over the entire scanning range of $+Omega_{max}$ to $-Omega_{max}$, as is also the case for the object pixel size B which is selected for the resampling process. The entire scanning strip therefore comprises n lines, each with pixel width B. It is noted that the variable n is constant.

The present invention provides that these scanning strips adjoin the subsequent scanning strips without gaps or overlaps, regardless of the flight altitude h or the flying speed v and only by changing the focal length F and the scanning speed U. The line number n of all of the scanning strips and also the object pixel flow, i.e. the quantity of data conveyed for the entire object pixel, remains constant. Only the object pixel size B changes corresponding to the flight altitude and the flying speed according to the following equation (6) below:

$$B = K_B \cdot \sqrt{h \cdot v} \quad (6)$$

The actual resampling process, with the necessary parameters, also remains constant, which can be confirmed by the following observation. The object pixel, in relation to the plane of the sensor line 14, has a value which is given by equation (7) below:

$$P_B = B \cdot \frac{F}{E} \quad (7)$$

When B is taken as the term according to equation (6), and the variables F and E are as defined by the equations (8) and (9), respectively, $$B = K_B \sqrt{h \cdot v} \quad (6)$$

$$F = K_F \sqrt{\frac{h}{v}} = \frac{p \cdot k}{K_B} \sqrt{\frac{h}{v}} \quad (8)$$

$$E = \frac{h}{\cos(\text{Omega})} \quad (9)$$

then the following equations (10) and (11) may be obtained:

$$P_B = K_B \sqrt{h \cdot v} \cdot \frac{p \cdot k}{K_B} \cdot \sqrt{\frac{h}{v}} \cdot \frac{\cos(\text{Omega})}{h} \quad (10)$$

$$\frac{P_B}{P} = k \cdot \cos(\text{Omega}) \quad (11)$$

In this manner, it can be seen that the decisive ratio $P_B/P$, for the resampling process, depends only upon the constant k and the scanning angle Omega, and not on the flight altitude h or the flying speed v. Accordingly, the same resampling process can be used for every flight altitude and for every flying speed insofar as the focal length and the rotational speed of the scanning system are adjusted correspondingly to the indications in the present invention.

Referring once again to FIG. 1A, the sensor 14 is controlled by the signal t of the processor. The signal s of the sensor is used by the processor for the resampling processes which are not described in detail herein. This results in a regular object pixel grid having a constant line number n and object pixel size B.

FIG. 3 illustrates the flow chart or the data flow of the present invention in greater detail. The flight altitude h, over the ground, is continuously detected e.g. by a radar altimeter, and supplied digitally-serially to input registers 41 and 42 which are illustrated in FIG. 1A. Subsequently, the processes 51 to 56, which are illustrated in the flow chart of FIG. 3, are carried out serially at a frequency of, for example, 50 Hz, i.e. in step increments of roughly 20 ms. According to block 51, the reference or the desired rotational speed U, of the scanning prism, is calculated by the constants $K_U$ which are stored in the memory of the processor, and the variables h and V.

The actual speed U and the difference $d_u = 2U - U'$, which is supplied by the pulse transmitter 27 of FIG. 1A, are formed according to blocks 51 and 52 of FIG. 3. This is transformed in the digital-to-analog converter 4 of FIG. 1A into an analog signal by which the servomotor 26 is constantly brought to the correct reference speed U via the amplifier 7. Accordingly, there is always a closed regulating process due to the actual speed U' measured by the pulse transmitter 27.

The system focal length F is calculated by the stored constants $K_F$ and the variables h and v in block 53 in accordance with equation (8) above. The reference distance parameters b and e are read out of the look-up table 54 with this focal length F.

With reference to FIG. 1A, the actual values b' and e' are read out of the angular position transmitters 12 and 13 from which the differences $d_b$ and $d_e$ are formed from reference values and actual values, according to blocks 55 and 56 of FIG. 3, converted to analog signals in the converters 5 and 6, and transmitted via the amplifiers 8 and 9, to the servomotors 10 and 11 which adjust the lenses 18 and 19 to the correct distances b and e, via the spindles 16 and 24. There is also a back-coupling or feedback or regeneration, via the absolute measured value transmitters 12 and 13, and, accordingly, a closed regulating process which always ensures the correct adjustment.

It is important to note that the constants $K_B$, $K_F$ and $K_U$, are functions of the parameters of the scanner, namely, the detector size p, the detector quantity M, and the focal length range $F_{min}$ to $F_{max}$, as well as the operating parameters which include the maximum scanning angle $\text{Omega}_{max}$, the maximum flight altitude $h_{max}$, the maximum flying speed $v_{max}$ and the maximum object pixel size $B_{max}$.

Figure 5A:
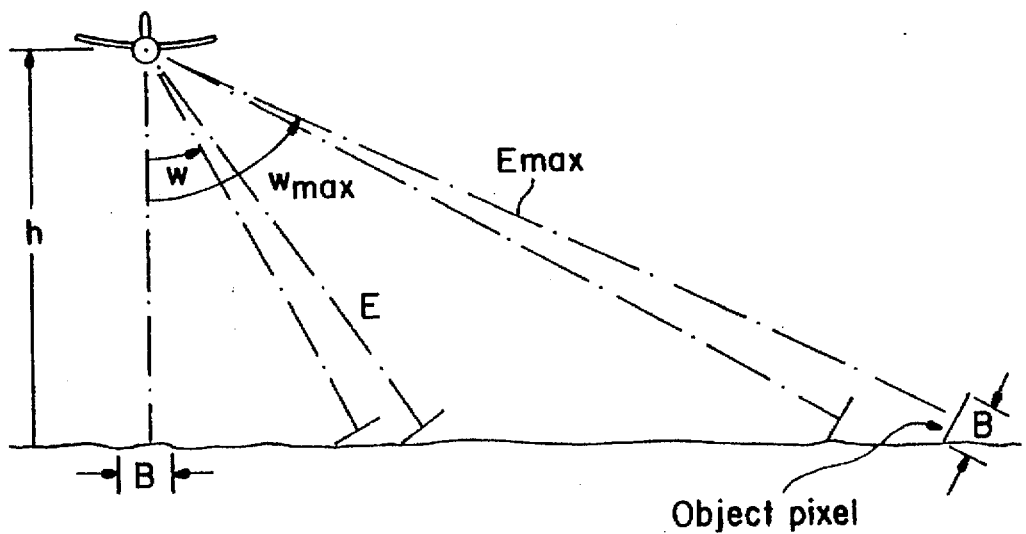
FIGS. 5A and 5B illustrate the picture (frame or survey) geometry in a section normal to the flight direction.
Figure 5B:
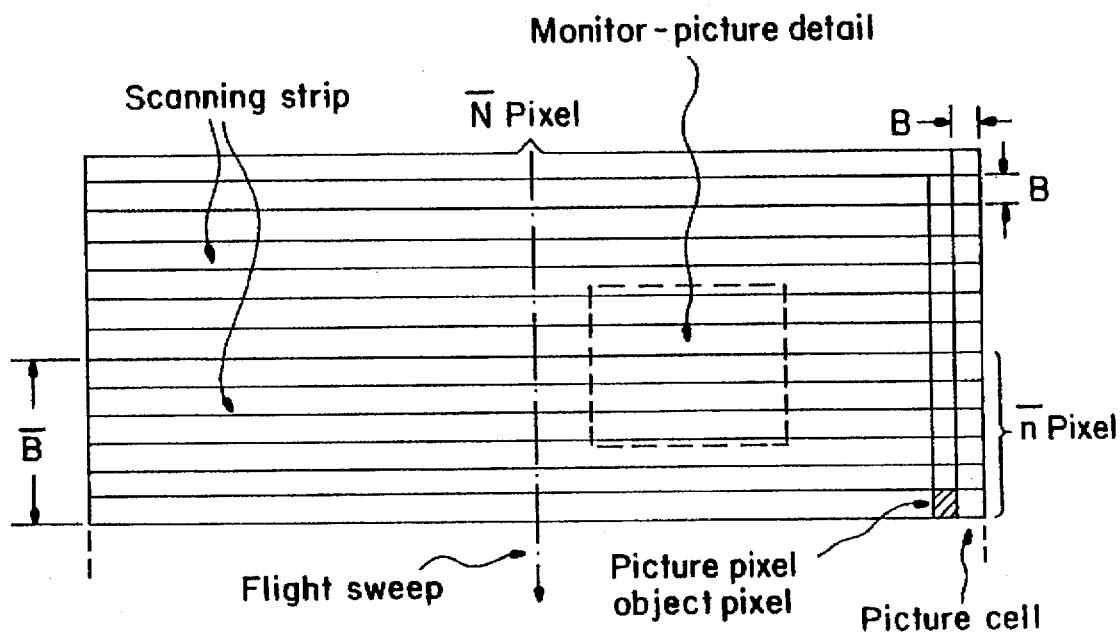

There exists, between the above parameters, the following relationship, given by equation (11) which is derived from the information contained in FIGS. 5A and 5B.

$$\frac{B_{max}}{P} = \frac{E_{max}}{F_{max}} = \frac{h_{max}}{F_{max} \cos(\text{Omega}_{max})} \quad (12)$$

Since the scanner parameters p and $F_{max}$ are provided, two of the three operating parameters $B_{max}$, $h_{max}$ and $\text{Omega}_{max}$ can be optionally selected while the third can be determined by equation (12) above. It is also advisable to derive the operating constant $K_B$ with the determined operating parameters from equation (13) below:

$$K_B = \frac{B_{max}}{\sqrt{h_{max} \cdot v_{max}}} \quad (13)$$

The terms A, $C_1$, $K_B$, $K_F$, and $K_U$ are related to one another by the following equations (14) and (15):

$$K_F = p \cdot A \cdot c = \frac{p \cdot k}{K_B} \quad (14)$$

$$K_U = \frac{C}{A} = \frac{1}{K_B \cdot n \cdot r} \quad (15)$$

As can be seen, the constants $K_B$, $K_F$ and $K_U$ are determined exclusively by the scanner parameters and the constant parameters of the selected operating range.

This operating range of the scanner, i.e. the entire maximum scanning angle, the maximum flight altitude, and the maximum object pixel size can therefore be selected, and also modified, in flight while taking into account the above equation (12) merely by a corresponding change in the software constants $K_F$ and $K_U$. It should be noted that the maximum scanning angle remains constant for the entire operating range between the minimum and the maximum flight altitude.

While the present invention has been described in a preferred embodiment, such description is merely illustrative of the present invention and is not to be construed as a limitation thereof. In this regard, the present invention is meant to encompass all modifications, variations and/or alternate embodiments with the scope of the present invention limited only by the claims which follow.

What is claimed is:

1. A method for scanning a surface of an object transversely to a direction of motion, comprising the steps of:
    providing a scanner flying over the object at a flight altitude and with a flight velocity and having a system focal length, wherein a scanning element rotates with a rotation speed thereby scanning the surface over a scanning angle and a detector row which is arranged at right angles to the direction of said scanning;
    providing said detector row with a plurality of individual detectors of equal size and which are capable of generating fundamental object pixels of a size dependent upon a distance from the object up to a maximum scanning distance;
    deriving a standard object pixel of a size corresponding to a fundamental object pixel at said maximum scanning distance;
    forming, for each scanning sweep, by means of a sampling process from said fundamental object pixels, a uniform grid composed of standard object pixels of said size corresponding to a fundamental object pixel at said maximum scanning distance in several lines without one of gaps and overlaps; wherein uniform grids of consecutive sweeps have no gaps and overlaps between each other;

performing said sampling process for forming a uniform grid independent of an actual flight altitude and an actual same flight velocity in a same manner for each scanning sweep; and controlling the system focal length and the rotational speed of the scanner at flight altitudes and velocities which are other than pre-determined as functions of an actual flight altitude and said actual flight velocity so that said uniform grids of consecutive scanning sweeps have no gaps and overlaps between each other.

2. The method of claim 1, wherein said controlling step includes controlling the system focal length of the scanner as a function of the square root of the ratio of flight altitude to flight speed, and further wherein said step of controlling said rotational speed of said scanning element includes controlling said rotation as a function of the square root of the ratio of flight speed to flight altitude.

3. The method of claim 2, wherein, for a scanner having two individual optical components with a spacing therebetween and each having respective focal lengths, said controlling step includes controlling said spacing as a function of the system focal length.

* * * * *